Figure 1:
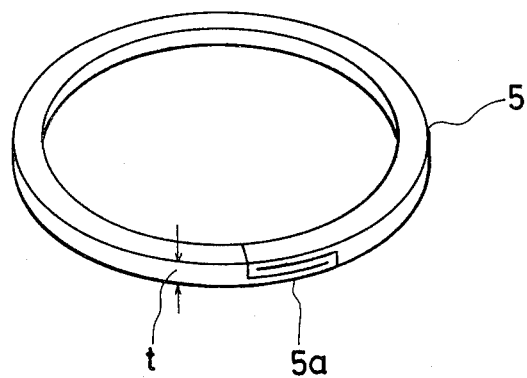

United States Patent [19]

Sugimura

[11] 4,431,200
[45] Feb. 14, 1984

[54] BACK-UP RING WITH SLITTED, FOLDED PORTION FOR PACKING OF HYDRAULIC APPARATUS

[76] Inventor: Nobuyuki Sugimura, 308 Mabase, Shimizu-Shi Shizuoka-ken, Japan

[21] Appl. No.: 494,999

[22] Filed: May 16, 1983

[30] Foreign Application Priority Data

Jun. 26, 1982 [JP] Japan ............................. 57-96139[U]

[51] Int. Cl.³ ............................................... F16J 9/00
[52] U.S. Cl. .................................... 277/215; 277/200; 277/220
[58] Field of Search .................. 277/1, 9, 120, 121, 277/200, 202, 203, 215, 220, 237

[56] References Cited

U.S. PATENT DOCUMENTS 3,897,072  7/1975  Inka et al. ........................ 277/215

FOREIGN PATENT DOCUMENTS 2218096 10/1973  Fed. Rep. of Germany ...... 277/215
1177016 12/1958  France ................................ 277/215
46-32881  9/1971  Japan ....................................... 277/9

Primary Examiner—Robert S. Ward
Attorney, Agent, or Firm—Wood, Dalton, Phillips, Mason & Rowe

[57] ABSTRACT

A back-up ring to prevent damage to a packing ring disposed in a groove on an internal piston within a cylinder. The back-up ring has a folded portion with concave and a convex surfaces to prevent damage to the ring when it is unfolded to enlarge the ring for placement in the groove and re-folds to seat in the groove. In another embodiment, holes are disposed in the folded portion to relieve stress concentrations accompanying folding and unfolding of the back-up ring.

4 Claims, 11 Drawing Figures

BACK-UP RING WITH SLITTED, FOLDED PORTION FOR PACKING OF HYDRAULIC APPARATUS

The present invention relates to a back-up ring which is so used as to prevent a damage to a packing used at a sealing part beween an internal surface of an external hollow cylinder and an external surface of an internal piston which closely fits in the external hollow cylinder in various kinds of hydraulic apparatus.

In the past, sealing parts of various kinds of hydraulic apparatus have been equipped with a packing which is seated in a concave groove made on an external surface of an internal piston which closely fits in an external hollow cylinder, and thereby prevents a leakage of the hydraulic fluid. But, as the hydraulic pressure increases, the packing is pushed and deformed in the direction of the hydraulic pressure, a part of the packing being squeezed into a narrow space between the internal piston and the external hollow cylinder, thereby the sealing effect deteriorating, the hydraulic fluid leaking, which possibly causes a fatal defect of the hydraulic apparatus.

One way considered to avoid this kind of phenomenon in which a packing is broken locally has been a usage of a back-up ring, with the packing, which is used in a general sealing apparatus. Heretofore, the back-up ring must have been provided with a cutoff part or must have had a shape of coil, for the convenience of increasing its diameter so as to fit into a concave groove of the internal piston and decreasing its diameter thereafter.

However, if the back-up ring has this kind of shape and when the internal piston is inserted into the external hollow cylinder from the pressurized side, one end of the back-up ring may be pushed out in the radial direction from the concave groove and lie on the external circumference of the packing, which possibly harms the sealing effect. While, when an internal piston having the back-up ring seated in the concave groove is inserted into an external hollow cylinder from the unpressurized side, one end of the back-up ring may be pushed out and sheared off by both the internal piston and the external hollow cylinder, which also possibly harms the effect of the back-up ring.

An object of this invention is to enable a process of fitting a back-up ring into a concave groove of an internal piston by easily extending its diameter at a sealing part of various kinds of hydraulic apparatus and to avoid one end of said back-up ring being pushed out by the friction of the internal surface of the external hollow cylinder to lay on an external circumference of a packing, which harms its sealing effect, when the internal piston, having the packing with the back-up ring in the concave groove, is inserted into the external hollow cylinder.

This invention has, in order to accomplish these objects, the provision of a back-up ring which is from the unpressurized side seated adjacent to a packing in a concave groove of an internal piston when the internal piston is inserted into an external hollow cylinder. The back-up ring has a cross-section of thin plate and is made of tetrafluoroethylene resin (Teflon, Polyflon, or the like), wherein a part of said back-up ring has a zig-zag shape and is folded triple in the thickness direction thereof, and furthermore the total thickness of the cross-section is uniform throughout the ring.

Figure 2:
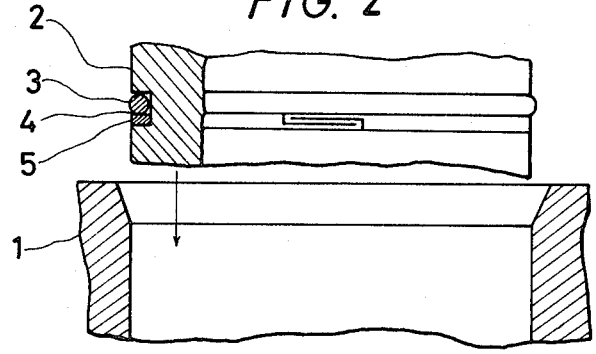
Figure 3:
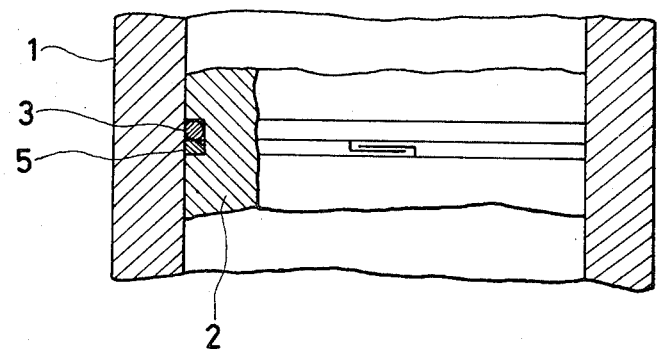
Figure 4:
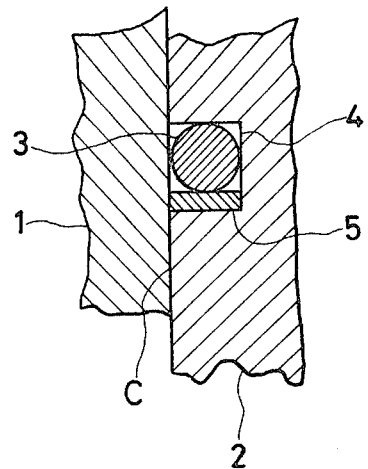
Figure 5:
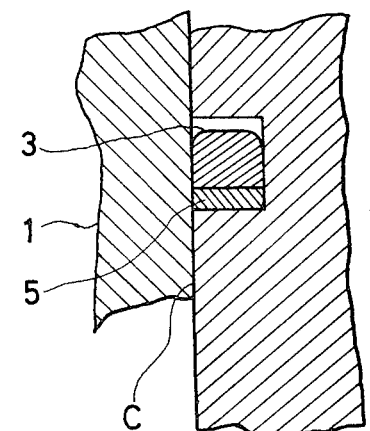
Figure 6:
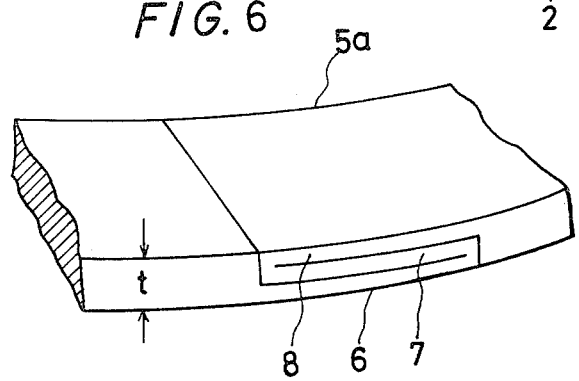
Figure 7:
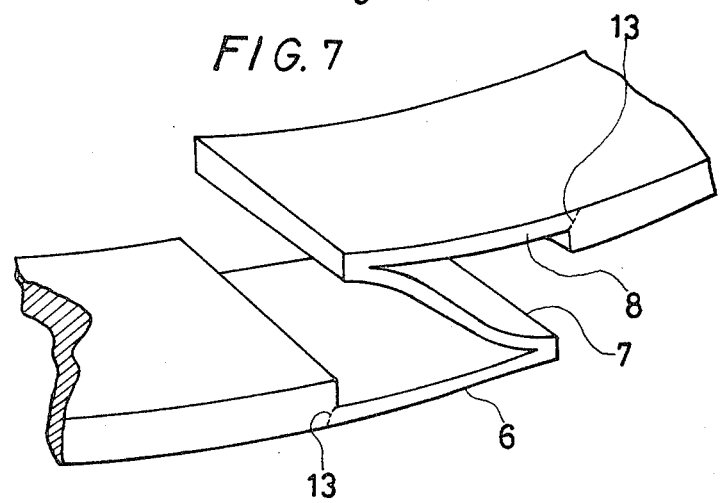
Figure 8:
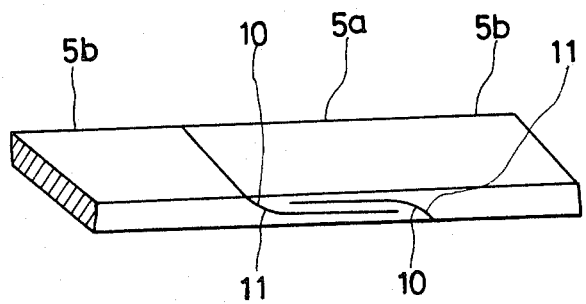
Figure 9:
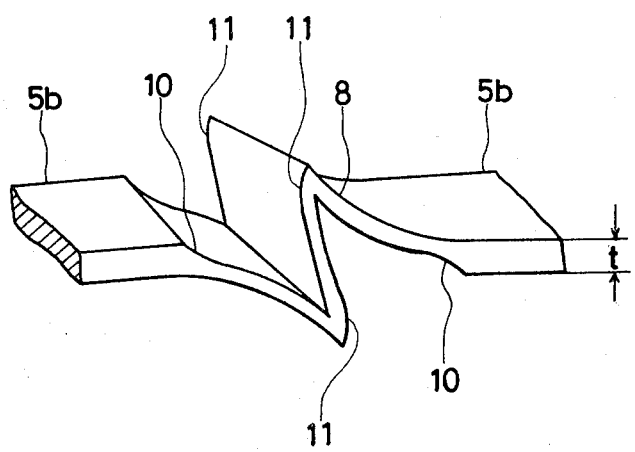
Figure 10:
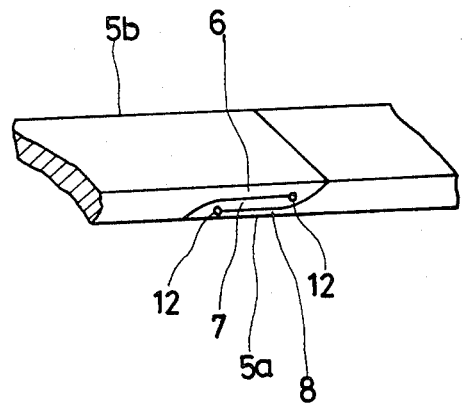
Figure 11:
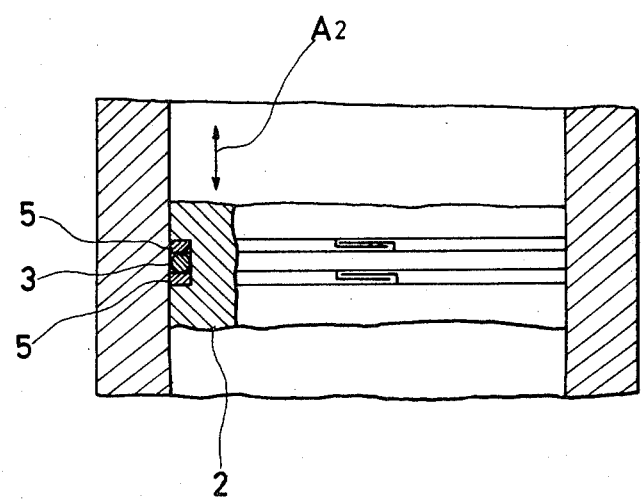

The objects and features of the present invention will become more apparent by reference to the following description of its preferred embodiments taken in conjunction with the accompanying drawings, in which:

FIG. 1 is a perspective view of a an embodiment of the present invention,

FIG. 2 is a cross-sectional view showing the condition of a back-up ring of the present invention mounted in a concave groove of an internal piston to be inserted into an external hollow cylinder, FIG. 3 is a cross-sectional view showing the back-up ring of FIG. 2 after the insertion is completed, FIG. 4 is an enlarged sectional view of a portion of FIG. 3, FIG. 5 is a cross-sectional view of the back-up ring shown in FIG. 4 under pressure, FIG. 6 is an enlarged perspective view of a portion of the back-up ring of FIG. 1, FIG. 7 is a perspective view of the back-up ring in FIG. 6 unfolded to expand the back-up ring, FIG. 8 is a perspective view corresponding to that shown in FIG. 6 in another embodiment of the present invention, FIG. 9 is a perspective view of a portion of FIG. 8 unfolded to expand the back-up ring, FIG. 10 is a perspective view in still another embodiment of the present invention, FIG. 11 is a cross-sectional view corresponding to that shown in FIG. 3 in another embodiment of the present invention.

In a hydraulic apparatus, not shown, a packing 3 is provided in a space between the internal surface of an external hollow cylinder 1 and the external surface of an internal piston 2 which is inserted into the external hollow cylinder, in order to prevent the hydraulic pressure from leaking. The packing 3 is mounted and seated adjacent to a back-up ring 5 which is made of tetrafluoroethylene resin or the like, in a concave groove 4 on the external surface of the internal piston. In this arrangement, the packing 3 elastically deforms from a state shown in FIG. 4 to a state shown in FIG. 5 in response to a hydraulic pressure of fluid acting thereon, while the back-up ring 5 elastically comes into close contact with the internal surface of the external hollow cylinder 1 and thus prevents a portion of the packing 3 from being pushed out of the concave groove 4 of the internal piston 2 and being squeezed into a space C. Formation of space C is inevitable in the machining process between the internal surface of the external hollow cylinder 1 and the external surface of the internal piston 2. Accordingly, the back-up ring 5 prevents said portion of the packing 3 from being sheared off.

The back-up ring 5 has a cross-section, as shown in FIG. 1 and FIG. 6, of a thin plate with a total thickness t, and has a large rigidity in its radial direction. Furthermore, a portion 5a consisting of three elements 6,7,8 of the back-up ring 5 can be folded triple in a zig-zag manner in the thickness direction. The elements 6,7,8 allows the back-up ring to extend its diameter by unfolding of each element 6,7,8 in the thickness direction to fit the back-up ring 5 into the concave groove 4. After placing the back-up ring 5 in the groove 4, the portion 5a is naturally folded again to recover its original shape as shown in FIG. 6, and thereby decreases its diameter for reception into the concave groove 4. Finally, the packing 3 is inserted adjacent to the back-up ring 5 in the concave groove 4 from the end of the piston exposed to pressure.

Since the back-up ring 5 according to the present invention has a folded portion 5a where the back-up ring 5 is folded triple in a zig-zag manner in its thickness t direction, the extension of the back-up ring 5 in its thickness t direction within the groove 4 is hindered by the width of the concave groove 4 and the packing 3. Therefore, when the internal piston 2 is inserted into the external hollow cylinder 1 from the pressurized side as shown in FIG. 2, the sealing effect is not hindered in that the back-up ring 5 cannot unfold to expand such that it lies on the top of the packing 3.

In conjunction with the rigidity in the radial direction of the back-up ring 5 due to its thin-plate shape, greatly increases the sealing effect of the packing.

Furthermore, the other embodiments of the present invention are described referring FIG. 8 through FIG. 10.

FIG. 8 shows a back-up ring 5 having a folded portion 5a which defines a smooth curve of concave surface 10 at the joint between a main body portion 5b of the back-up ring 5 and the folded portion 5a defining a zig-zag shape. The concave surface 10 is formed by a J-shaped first slit 13 having a first circumferential portion 14 and a concave portion 15 extending from the first circumferential portion 14 outward through one face of the back-up ring 5. The opposite part in the folded portion 5a defines a convex surface 11 at the joint between the main body 5b and the folded portion 5a. Similar to the concave surface 10, the convex surface 11 is formed by a J-shaped second slit 16 having a second circumferential portion 17 and a convex portion 18 extending from the second circumferential portion 17 outward through the other face of the back-up ring 5. The concave and convex surfaces 10,11 prevent the portion 5a folded in a zig-zag manner from being damaged at the corresponding narrow part 13 shown in FIG. 7.

FIG. 10 shows a back-up ring in another embodiment of the present invention, with the folded portion 5a of FIG. 8 having small holes 12 at the ends of the first and second circumferential portions 14 and 17 opposite the respective concave and convex surfaces 10,11. The small holes 12 disperse the stress concentration often generated by the roots of the folded portion 5a during folding and unfolding thereby preventing the folded portion 5a from being damaged.

It is to be noted that at the sealing part of the hydraulic apparatus, there is alternatively an internal piston 2 which moves back and forth as shown by $A_2$ direction in FIG. 11, within the external hollow cylinder 1. In this case, a perfect sealing effect can be expected by placing back-up rings 5 at both sides of the packing 3 which is mounted in the concave groove 4 made on the external surface of the internal piston 2, even if the direction of hydraulic pressure changes with the sliding motion of the internal cylinder 2.

I claim:

1. In an endless back-up ring having axially spaced faces and having a folded portion which defines a zig-zag shape, the improvement comprising:

said folded portion has a smooth concave surface defined by a first slit extending from one face toward the other face, said slit having a first circumferentially extending portion spaced from said other face and a concave portion extending from said first circumferential portion to said one face; and said folded portion further includes a convex surface defined by a second slit extending from said other face toward said one face, said second slit having a second circumferentially extending portion intermediate said first circumferential portion and said one face and a convex portion extending from said second circumferential portion to said other face whereby said folded portion my be unfolded to expand the ring, said concave and convex surfaces preventing damage to said folded portion.

2. The back-up ring of claim 1 wherein said first and second circumferential portions are parallel and coextensive.

3. The back-up ring of claim 2 wherein said first and second circumferentially portions are equally spaced from each other and said faces.

4. The back-up ring of claim 1 wherein said first and second circumferential portions each have a hole at each end thereof opposite said concave and convex portions, said holes preventing stress concentrations in said folded portion.

* * * * *